US009286527B2

(12) United States Patent
Wang et al.

(10) Patent No.: US 9,286,527 B2
(45) Date of Patent: Mar. 15, 2016

(54) SEGMENTATION OF AN INPUT BY CUT POINT CLASSIFICATION

(71) Applicant: Google Inc., Mountain View, CA (US)

(72) Inventors: Li-Lun Wang, Sunnyvale, CA (US); Thomas Deselaers, Zurich (CH); Henry Allan Rowley, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 60 days.

(21) Appl. No.: 14/184,997

(22) Filed: Feb. 20, 2014

(65) Prior Publication Data

US 2015/0235097 A1    Aug. 20, 2015

(51) Int. Cl.
*G06K 9/62* (2006.01)
*G06K 9/00* (2006.01)
*G06N 99/00* (2010.01)
(Continued)

(52) U.S. Cl.
CPC ........ *G06K 9/00865* (2013.01); *G06K 9/00402* (2013.01); *G06K 9/222* (2013.01); *G06K 9/6256* (2013.01); *G06K 9/66* (2013.01); *G06N 99/005* (2013.01)

(58) Field of Classification Search
CPC .......... G06K 9/00865; G06K 9/00402; G06K 9/6256; G06K 9/222; G06K 9/66; G06K 9/6217; G06K 9/6282
USPC ......... 382/159, 186, 187, 156, 161, 189, 173, 382/119, 188, 224, 185, 228, 231, 190, 181, 382/179, 178, 177, 165, 123, 122, 242, 226, 382/263, 262; 345/156, 441, 582; 715/780, 715/863, 772, 246, 273; 704/257, E15.005; 705/1.1, 7.11; 707/706
See application file for complete search history.

(56) References Cited

U.S. PATENT DOCUMENTS 5,751,850 A    5/1998 Rindtorff
5,805,731 A *  9/1998 Yaeger et al. ................. 382/228
(Continued)

FOREIGN PATENT DOCUMENTS

CA    2 463 230      7/2009
WO    96/00424       1/1996
WO    2014/027703    2/2014

OTHER PUBLICATIONS

Graves et al.,"Unconstrained Online Handwriting Recognition with Recurrent Neural Networks", Advances in Neural Information Processing Systems 21, NIPS'21, p. 577-584, 2008, MIT Press, Cambridge, MA, 2008.

(Continued)

*Primary Examiner* — Sheela C Chawan
(74) *Attorney, Agent, or Firm* — Fish & Richardson P.C.

(57) ABSTRACT

Techniques are provided for segmenting an input by cut point classification and training a cut classifier. A method may include receiving, by a computerized text recognition system, an input in a script. A heuristic may be applied to the input to insert multiple cut points. For each of the cut points, a probability may be generated and the probability may indicate a likelihood that the cut point is correct. Multiple segments of the input may be selected, and the segments may be defined by cut points having a probability over a threshold. Next, the segments of the input may be provided to a character recognizer. Additionally, a method may include training a cut classifier using a machine learning technique, based on multiple text training examples, to determine the correctness of a cut point in an input.

36 Claims, 6 Drawing Sheets

(51) Int. Cl.
  *G06K 9/22* (2006.01)
  *G06K 9/66* (2006.01)

(56) References Cited

U.S. PATENT DOCUMENTS

| | | | |
|---|---|---|---|
| 5,889,889 A * | 3/1999 | Sinden | 382/187 |
| 6,339,655 B1 | 1/2002 | Aharonson et al. | |
| 6,393,395 B1 | 5/2002 | Guha et al. | |
| 6,519,363 B1 * | 2/2003 | Su et al. | 382/177 |
| 7,302,099 B2 * | 11/2007 | Zhang et al. | 382/186 |
| 7,646,940 B2 * | 1/2010 | Chellapilla et al. | 382/305 |
| 7,734,094 B2 | 6/2010 | Revow | |
| 7,756,337 B2 * | 7/2010 | Chen et al. | 382/187 |
| 7,844,114 B2 * | 11/2010 | Chellapilla et al. | 382/185 |
| 7,929,769 B2 * | 4/2011 | Wang et al. | 382/187 |
| 8,005,294 B2 * | 8/2011 | Kundu et al. | 382/159 |
| 8,615,131 B2 * | 12/2013 | El-Sana et al. | 382/189 |

OTHER PUBLICATIONS

Wan, Xiang et al., "On-line Chinese Recognition System for Overlapping Samples", 2011 International Conference on Document Analysis and Recognition, pp. 167-182, 2011.

Yaeger et al., "Combining Neural Networks and Context-Driven Search for Online, Printed Handwriting Recognition in the Newton", AAAI's AI Magazine, Spring 1998.

Zou, Yanming et al., "Overlapped handwriting input on mobile phones", 2011 International Conference on Document Analysis and Recognition, pp. 369-373, 2011.

* cited by examiner

SEGMENTATION OF AN INPUT BY CUT POINT CLASSIFICATION

BACKGROUND

In general, handwriting recognition is the ability of a computer to receive and interpret intelligible handwritten input from sources such as paper documents, photographs, touchscreens and other devices. Among various recognition techniques, a complete handwriting recognition system also handles layout analysis, performs correct segmentation into characters and finds the most plausible words. Similarly, optical character recognition (OCR) is the mechanical or electronic conversion of scanned images of typewritten or printed text into machine-encoded text. In handwriting recognition and OCR, the task is to recognize an input, such as a handwritten or printed input (e.g., a handwritten sample or a scanned document), and provide an output of any text encoding, such as a Unicode string, matching the input. The output may also comprise of the formatting and layout based on the input.

BRIEF SUMMARY

According to an implementation of the disclosed subject matter, a computer-implemented method may include receiving, by a computerized text recognition system, an input in a script. A heuristic may be applied to the input to insert a plurality of cut points. For each of the plurality of cut points, a probability may be generated and the probability may indicate a likelihood that the cut point is correct. Next, a plurality of segments of the input may be selected, the plurality of segments of the input defined by cut points having a probability over a threshold. As a result, the plurality of segments of the input may be provided to a character recognizer.

According to an implementation of the disclosed subject matter, a computer-implemented method may include receiving a plurality of text training examples, each text training example including a portion of text, a plurality of cut points that separate the portion of text into a plurality of segments, and for each of the plurality of cut points in the text training example, an indication of the correctness of the cut point. Next, a cut classifier may be trained, using a machine learning technique, based on the plurality of text training examples, to determine the correctness of a cut point in an input.

An implementation of the disclosed subject matter provides a system including a processor configured to receive, by a computerized text recognition system, an input in a script. A heuristic may be applied to the input to insert a plurality of cut points. A probability may be generated for each of the plurality of cut points and the probability may indicate a likelihood that the cut point is correct. As a result, a plurality of segments of the input defined by cut points having a probability over a threshold may be selected. The plurality of segments of the input may be provided to a character recognizer.

An implementation of the disclosed subject matter provides a system including a processor configured to receive a plurality of text training examples. Each text training example may include a portion of text, a plurality of cut points that separate the portion of text into a plurality of segments, and for each of the plurality of cut points in the text training example, an indication of the correctness of the cut point. Next, a cut classifier may be trained using a machine learning technique, based on the plurality of text training examples, to determine the correctness of a cut point in an input.

According to an implementation of the disclosed subject matter, a method may include means for receiving, by a computerized text recognition system, an input in a script. The method may include means for applying a heuristic to the input to insert a plurality of cut points. For each of the plurality of cut points, the method may include a means for generating a probability, and the probability may indicate a likelihood that the cut point is correct. Next, a means for selecting a plurality of segments of the input may be provided, and the plurality of segments of the input may be defined by cut points having a probability over a threshold. As a result, the method may include a means for providing the plurality of segments of the input to a character recognizer.

Implementations of the disclosed subject matter provide methods and systems for improved segmentation of an input by classifying the correctness of cut points inserted by applying a heuristic to the input. Also disclosed are methods and systems for training a cut point cut classifier in a text recognition system. Techniques disclosed herein allow for more precise cut points in an input. This may result in fewer cut points for consideration making it more likely that the system will identify the best interpretation of the input. This may improve both the speed and accuracy of the text recognition. In addition, segmentation of an input may be more flexible. A trained cut classifier may be able to segment input for which it would challenging to design good heuristics, such as handwriting which overlaps with itself. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter.

DETAILED DESCRIPTION

Figure 1:
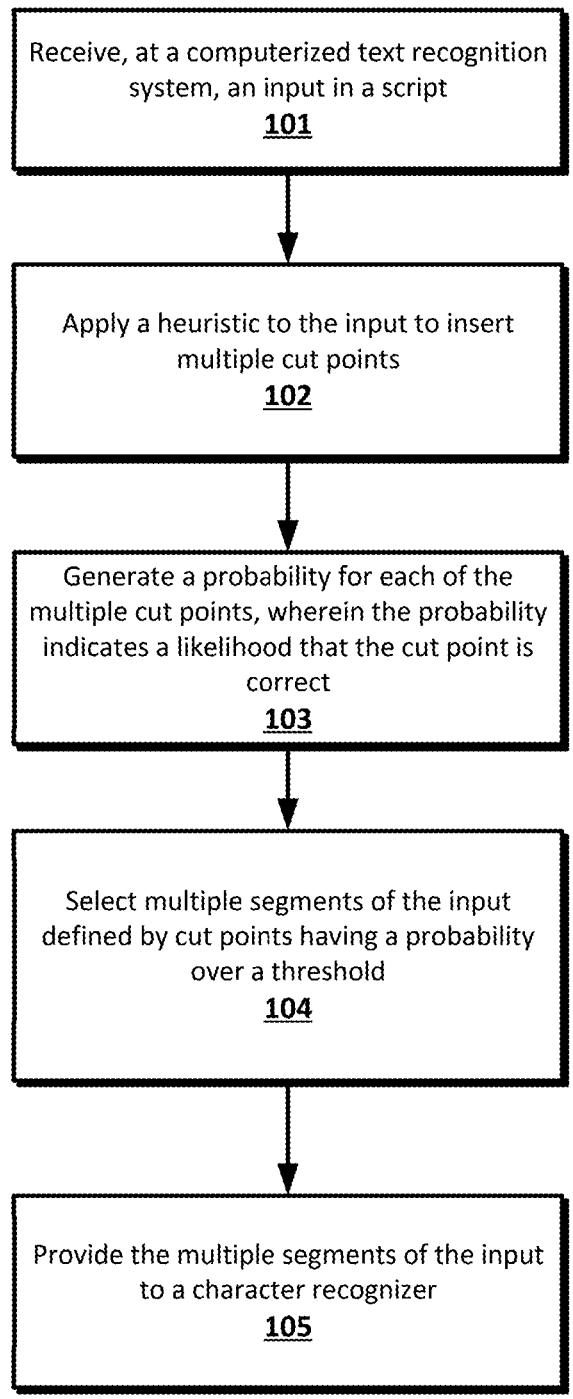
FIG. 1 shows an example process according to an implementation of the disclosed subject matter.

In text recognition, such as handwriting recognition or OCR, segmentation of an input, such as a handwriting or printed input (e.g., a handwritten sample or a scanned document), into characters can be a critical step in multi-character text recognition. Text recognition systems may be trained according to various machine learning techniques. During a training phase of handwriting recognition and OCR systems, a received input may be segmented based on cut points identified in the input. As a result, correct cut point classification and the resulting segmentation of an input can drastically affect the speed and accuracy of a text recognition system. An input may be segmented by inserting cut points. Typically, cut points are hypothesized between potential characters using heuristics, and may be combined with other information, such as character recognition results and language models, to determine the best way to interpret the input and thereby recognize characters. It is necessary that the recall of these hypothetical cut points be high, i.e., every real character boundary is included as a hypothetical cut point. This is often done by applying a relatively aggressive heuristic to over-segment the input. However, if the input is segmented too aggressively, there may be too many hypothetical segments, making it difficult to determine the best character recognition hypothesis. As a result, the speed and the accuracy of a recognizer in a text recognition system may be negatively affected. For this reason, it is important for the cut points made in an input to be as precise as possible for an acceptable level of recall, resulting in as few cut points as possible while making as many cuts points as necessary.

Taking handwriting recognition as an example, on-line handwriting recognition involves the automatic conversion of text as it is written on a device that receives handwritten input, such as where a sensor detects pen-tip movements as well as pen-up/pen-down switching. This data is typically known as digital ink and can be regarded as a digital representation of handwriting. In a handwriting recognition system, cut points may be inserted into a handwritten input, dividing the handwritten input into segments of ink pieces that may be provided to a recognizer for recognition of characters. In most multi-character handwriting recognition systems, correct segmentation of a handwritten input is critical to the speed and accuracy of the recognition of characters in the input. As mentioned above, segmentation of an input is often done by inserting possible cut points based on heuristics. For example, a Latin script-based recognizer may segment the characters by inserting cut points at stroke boundaries (e.g., if there are clearly disconnected strokes, a cut point will be inserted between the strokes), at the local minima in the height of the ink, and additionally placing one or more cut points in between these local minima. In order to achieve a sufficiently high recall of the cut points, the handwriting input may be over-segmented. However, the computation cost for recognition increases with the amount of over-segmentation, and this cost may be compounded for scripts with large character sets (e.g., Chinese with more than 10,000 characters). Thus, it is important for the cut points made in an input to be as precise as possible, resulting in improved speed and the accuracy of a recognizer in a text recognition system. Furthermore, segmentation based on simple heuristics is typically not flexible enough to deal with uncommon arrangements of characters. For example, a monotonic segmentation technique used by a Chinese, Japanese, and/or Korean recognizer may insert cut points before strokes that are drawn sufficiently to the right or below the previously drawn strokes, and thus cannot handle characters that overlap previously written characters without including additional logic.

In general, the present disclosure provides method and systems for applying an aggressive heuristic that segments an input by inserting cut points into the input, and then classifying each of the cut points (e.g., as correct or incorrect) by a trained cut classifier after they have been inserted by the heuristic. For example, for each cut point inserted by a heuristic in an input, one or more features associated with each cut point may be determined and provided to a cut classifier. As an example, for each cut point inserted in an input, a feature such as the coordinates of endpoints of a number of adjacent segments may be determined. The coordinates may be normalized, for example, with respect to the boundaries of the input area in which the input is received. Another feature may be the type of cut inserted by the heuristics between the segments, such as a cut point placed at a local minimum, a cut point placed in between local minima, etc. These features may be provided to a cut classifier, and based on these features, the cut classifier may classify each cut as being correct or incorrect. Cut classifiers may be, for example, neural networks, logistic regression methods, and any other classification approach. Typically, a cut classifier may generate a probability indicating how likely a particular cut point correctly segments two characters. This probability may be compared to a threshold, and cut points having a probability that exceeds the threshold may be retained whereas cut points having a probability that do not exceed the threshold may be removed. The threshold may be chosen to achieve a high recall of the cut points. The probability of the retained cut points may also be stored and used in combination with character recognition results and language models.

Implementations of the disclosed subject matter provide methods and systems for improved segmentation of an input by cut point classification using a trained cut classifier. FIG. 1 shows an example process according to an implementation of the disclosed subject matter. As shown, a computerized text recognition system may receive an input in a script, at 101. An input may be, for example, handwritten an input received from a user or a scanned image of text such as handwritten text, typewritten text, or printed text. A heuristic may be applied to the input to insert multiple cut points, at 102. Typically, a heuristic may be based on, or specific to, the script of the input. For example, a heuristic for Latin script may be different from a heuristic for Japanese script. In some cases, a heuristic may be the same for similar scripts, for example, a heuristic for Latin script may be the same as for Cyrillic script. Next, for each of the multiple cut points, a probability may be generated and the probability may indicate a likelihood that the cut point is correct, at 103. At 104, multiple segments of the input may be selected, for example by selecting segments of the input defined by cut points having a probability over a threshold. The selected segments of the input then may be provided to a character recognizer, at 105.

A probability for a cut point may be in any suitable format such as a value, a score, a number, a fraction, a percentage, and the like. Generating a probability for a cut point, inserted in an input by a heuristic, may be based on a variety of features associated with the cut point. Because the probability for a cut point may indicate the likelihood that the cut point is correct, the probability may be generated taking into account any number of features associated with the cut point. For example, the probability generated for each of the multiple cut points may be based on one or more features such as a coordinate of an endpoint of a first segment adjacent to a second segment defined at least in part by the cut point, a type of cut point associated with the cut point, a curvature of the input at the cut point, an input speed associated with strokes in the input, a region of the input area in which the cut point is located, and the like.

As an example, a coordinate of an endpoint of a first segment adjacent to a second segment defined at least in part by a cut point may be used to generate a probability that the cut point is correct. For a cut point, the coordinates of endpoints for one or more adjacent segments may be normalized with respect to the boundaries of an input area in which an input (e.g., handwriting ink input) may be received. The relative location of the coordinates of the endpoints of adjacent segments may indicate the likelihood that the cut point correctly segments a character in the input. Another feature associated with a cut point may be the type of cut point such as a local minimum cut point, an in-between cut point, and any other type of cut point. A type of cut point may be determined by the heuristic applied to the input. For example, a local minimum cut point may indicate it is likely that the cut point correctly segments a character in the input. In this case, a probability generated for a local minimum cut point may be higher than a probability generated for an in-between cut point. As described in further detail herein, the relative probability that a specific type of cut point, and/or a cut point defined by various other features, may be determined by a trained machine learning model such as a trained cut classifier. As another example of a feature that may be used to generate a probability for a cut point, a region of the input area in which the cut point is located may be used. For example, a small region of a rendered image input around a cut point may be used to generate a probability indicating the correctness of the cut point. Other features known in the art may be used to generate a probability for a cut point. More generally, it will be understood by one of skill in the art that any suitable feature may be used to generate a probability indicating the correctness of a cut point as disclosed herein.

According to an implementation, a probability may be generated by a trained cut classifier. For example, a trained cut classifier may classify each cut point as either a segmenting cut point (i.e., a correct cut point) or a non-segmenting cut point (i.e., an incorrect cut point) based on whether or not the cut point is likely to be between characters, as indicated by the probability generated for the cut point. In an implementation, a trained cut classifier may be associated with, or specific to, the heuristic applied to the input to insert cut points and/or the script of the input. For example, although the same heuristic may be applied to two different inputs (each in a different script), the cut classifier may be different for each script. Heuristics may insert cut points very aggressively as previously described. For example, the most aggressive heuristic could insert candidate cut points at every single point in the input. In this case, additional constraints may be implemented such that the output of the cut classifier reduces the number of cut points, for example, by removing cut points at consecutive points in the input. In general, a trained cut classifier may be trained using a machine learning technique such as neural network (e.g., deep belief network), k-nearest neighbor, support vector machine, logistic regression, adaboost, Gaussian mixture model, linear discriminant analysis, and any other machine learning technique suitable for generating a probability for a cut point in a text recognition system.

Figure 2A:
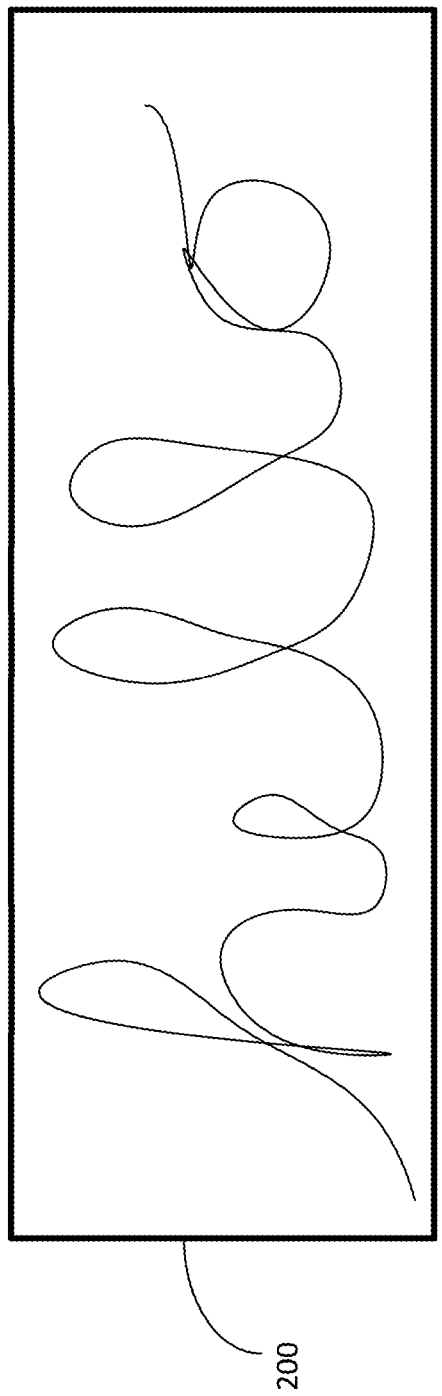
FIG. 2A shows an example an input according to an implementation of the disclosed subject matter.
Figure 2B:
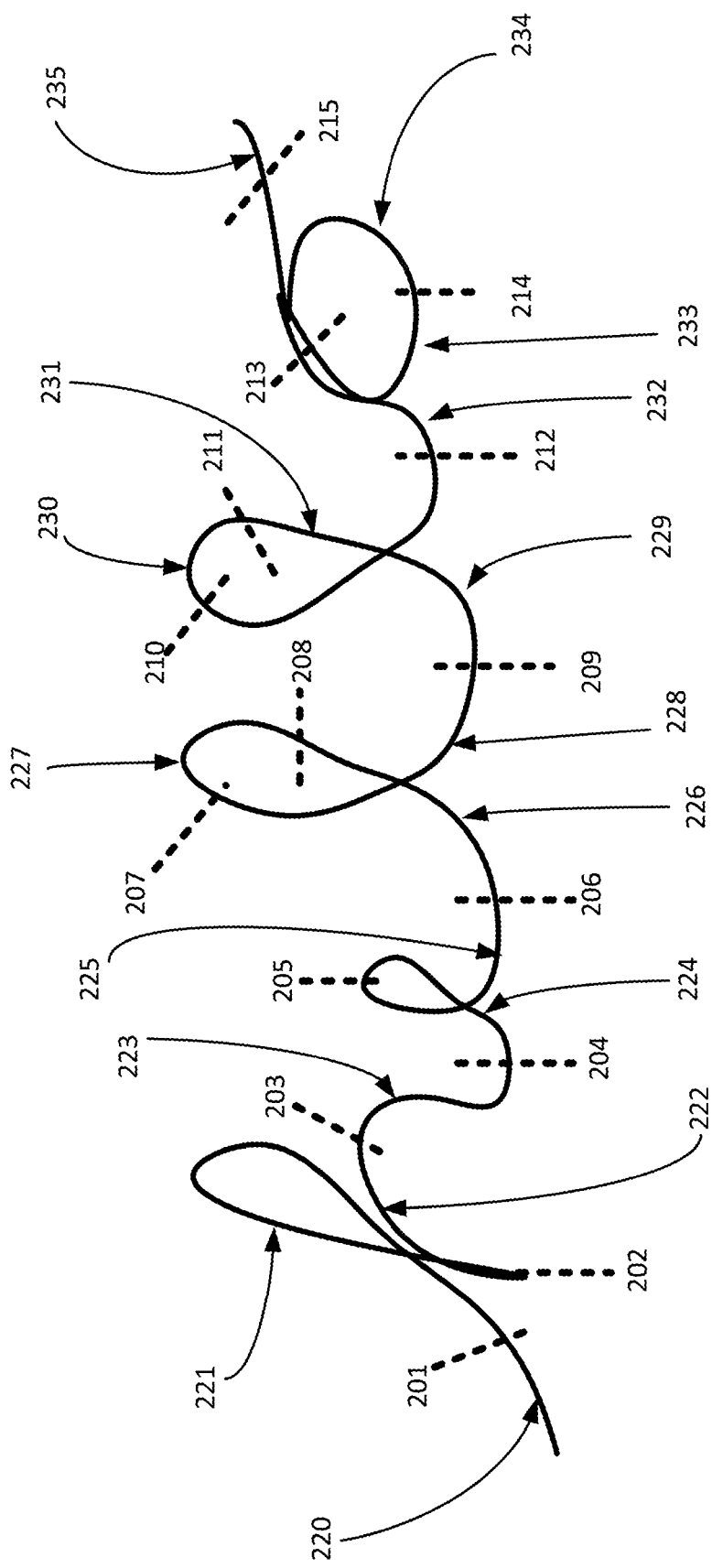
FIG. 2B shows an example an input, cut points, and segmentations according to an implementation of the disclosed subject matter.
Figure 2C:
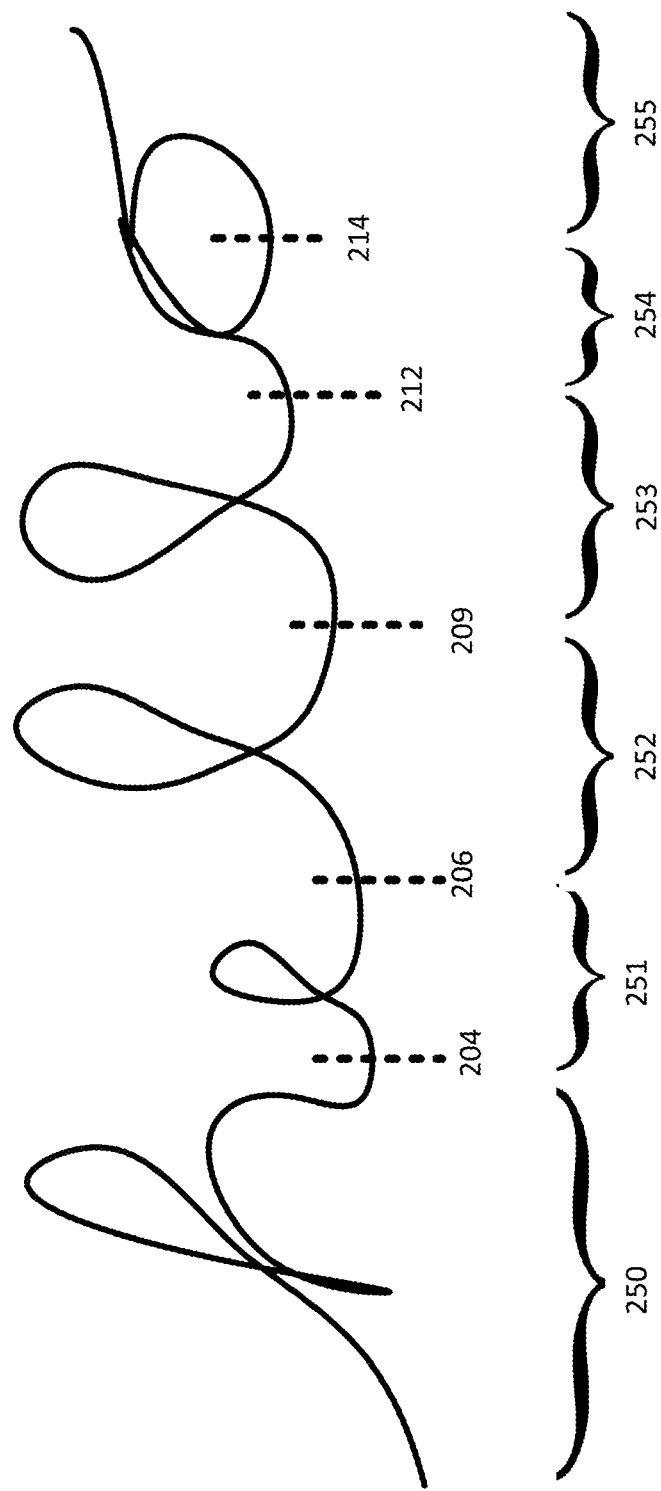
FIG. 2C shows an example an input, cut points, and segmentations according to an implementation of the disclosed subject matter.

FIG. 2A shows an example an input and FIGS. 2B and 2C show example cut points and segmentations according to an implementation of the disclosed subject matter. As shown in FIG. 2A, an input 200 may be received in Latin script. A heuristic, for example a heuristic based on Latin script, may be applied to the input 200 to insert multiple cut points. As shown in FIG. 2B, multiple cut points 201, 202, 203, 204, 205, 206, 207, 208, 209, 210, 211, 212, 213, 214, and 215 may be inserted in an input 200 based on application of the heuristic. Based on the multiple cut points 201, 202, 203, 204, 205, 206, 207, 208, 209, 210, 211, 212, 213, 214, and 215, multiple segments 220, 221, 222, 223, 224, 225, 226, 227, 228, 229, 230, 231, 232, 233, 234, and 235 may be defined. For each of the multiple cut points 201, 202, 203, 204, 205, 206, 207, 208, 209, 210, 211, 212, 213, 214, and 215, a probability may be generated to indicate the likelihood that the cut point is correct. According to an implementation, three segments and three cut points before and after a specific cut point, as well as the type of the specific cut point itself, may be used as features associated with the specific cut point to generate the probability for the cut point. As an example, a probability may be generated for cut point 202. Generating the probability for cut point 202 may be based on one or more features associated with cut point 202. For example, the normalized endpoint coordinates of the three segments prior to cut point 202 and the three segments after cut point 202 may be used to generate a probability for cut point 202. Because there are not three segments prior to cut point 202, i.e., there are only two segments 220 and 221, the endpoint coordinates for the third missing segment may be arbitrarily set to zero. Additionally, the endpoint coordinates for the three segments 222, 223, and 224 after cut point 202 may be used to generate a probability for cut point 202. Another feature may be the type of cut point for each of the adjacent cut points 201, 202, 203, 204, and 205. For example, cut points 202 and 204 may be of the local minima cut point type and cut points 201, 203, and 205 may be of the in-between cut point type. Based on these features, a probability of 0.6 may be generated for cut point 202. Alternatively, or in addition to the features described above, other features may be used in generating a probability for a cut point. As described herein, a cut point may be classified as "correct" or "incorrect" based on whether the cut point actually segments an input into two characters. A trained cut classifier may estimate the correctness of a cut point, but may not determine whether a cut point is actually correct. A probability for each of the other cut points 201, 203, 204, 205, 206, 207, 208, 209, 210, 211, 212, 213, 214, and 215 may be similarly generated, as shown in Table 1 below.

TABLE 1

| Cut Point | Probability | Correct? (Probability > Threshold) |
| --- | --- | --- |
| 201 | 0.2 | No |
| 202 | 0.6 | No |
| 203 | 0.4 | No |
| 204 | 0.9 | Yes |
| 205 | 0.2 | No |
| 206 | 0.9 | Yes |
| 207 | 0.5 | No |
| 208 | 0.6 | No |
| 209 | 0.9 | Yes |
| 210 | 0.4 | No |
| 211 | 0.5 | No |
| 212 | 0.9 | Yes |
| 213 | 0.3 | No |
| 214 | 0.8 | Yes |
| 215 | 0.2 | No |

As shown in Table 1 above, a probability may be generated for each cut point and each cut point may be classified as either segmenting (i.e., correct) or non-segmenting (i.e., incorrect) cut points based on the probability being greater than a threshold. A threshold may be a value, a score, a number, a fraction, a range, a percentage, and the like. A threshold may be based on a setting such as a user setting, a system setting, a default setting, and the like, and may also dynamically change based on factors such as the relative probabilities of each of the inserted cut points, the script of the input, the heuristic applied to the input, the total number of cut points inserted in the input, etc. In the example above, a threshold may be set at X such that a cut point having a probability greater than X is classified as a segmenting cut point and a cut point having a probability less than X is classified as a non-segmenting cut point. As shown in Table 1, each of the cut points 204, 206, 209, 212, and 214 may be classified as correct cut points based on each cut point having a probability greater than the threshold X. In some cases, the threshold may be automatically chosen to achieve a desired recall on a set of tuning data. Cut points may be distinguished by cut points that are actually at the character boundaries (e.g., ground truth, as provided in the training examples, or as a result of performing forced alignment) and cut points that the cut classifier determines have a high probability of being segmenting. For example, the threshold on which the indication of the correctness of cut points is based may be set such that a relatively high percentage, such as 99%, of the cut points identified as segmenting (i.e., correct) are retained. In some cases, the threshold, i.e., target recall, may be manually set high such as at 99% or the target precision may be set at a level such as 50%. As a result, they system may search for the threshold that achieves this target recall or precision while making the precision or recall as high as possible among the training examples.

Based on the classification of correctly segmenting cut points, multiple segments of the input may be selected, and each of the selected segments may be defined by the cut points that have a probability over the threshold. As shown in FIG. 2C, classification of cut points 204, 206, 209, 212, and 214, as likely being correctly segmenting cut points, may define multiple segments of the input 200. Segment 250 may be defined by the a cut point inserted at the beginning of the stroke and cut point 204, segment 251 may be defined by the cut points 204 and 206, segment 252 may be defined by the cut points 206 and 209, segment 253 may be defined by the cut points 209 and 212, segment 254 may be defined by cut points 212 and 214, and segment 255 may be defined by the cut point 214 and a cut point inserted at the end of the stroke. Accordingly, the multiple segments 250, 251, 252, 253, 254, and 255 may be selected and provided to a character recognizer for recognition. In general, and as shown in FIGS. 2B and 2C, the number of cut points having a probability over the threshold (i.e., the five cut points 204, 206, 209, 212, and 214) is less than the number of cut points inserted based on the heuristic (i.e., the 15 cut points 201, 202, 203, 204, 205, 206, 207, 208, 209, 210, 211, 212, 213, 214, and 215).

According to an implementation, all of the segments, including combinations of segments, shown in FIG. 2C may be provided to the character recognizer. For example, all of the cut points shown in FIG. 2C may be passed to the recognizer, and the recognizer may consider combinations of the segments induced by those cut points as possible characters. As shown in FIG. 2C, there may be a segment 254 created by cut points 212 and 214, and a segment 255 created by cut point 214 and a cut point inserted at the end of the stroke. The recognizer may consider the combination of segments 254 and 255, and as a result, the letter "o" may be recognized. In some cases, all combinations of neighboring segments may be sent to the recognizer, including combinations such as segments 251 and 252, segments 253, 254, and 255, etc. As a result, the complete recognition of the input may consist of a non-overlapping set of combinations of segments. As shown in FIG. 2C, segment 250 may be recognized as the letter "h", segment 251 may be recognized as the letter "e", segment 252 may be recognized as the letter "l", segment 253 may be recognized as the letter "l", and segment 254 and segment 255 may be recognized as the letter "o". According to an implementation, there will not be any unexplained segments of the input remaining after recognition.

Figure 3:
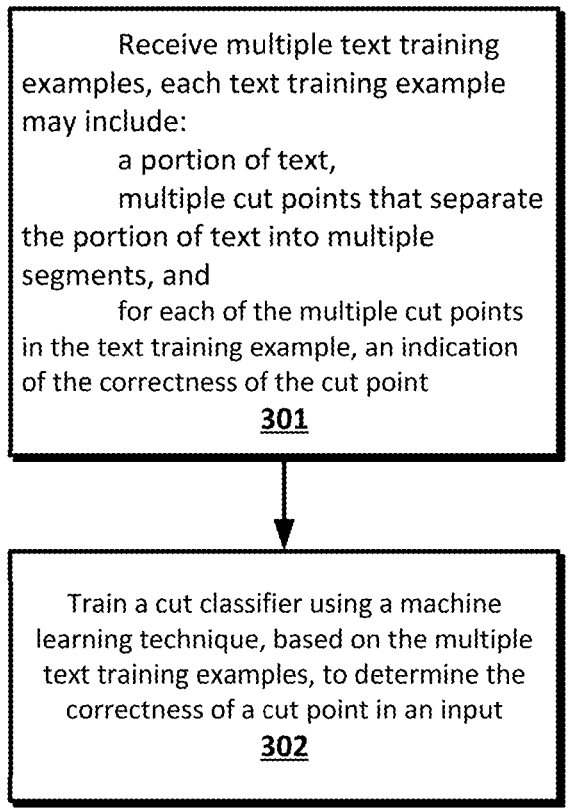
FIG. 3 shows an example process according to an embodiment of the disclosed subject matter.

Implementations of the disclosed subject matter provide methods and systems for training a cut classifier, in a text recognition system, to determine the correctness of a cut point in an input. FIG. 3 shows an example process according to an embodiment of the disclosed subject matter. As shown, a computer-implemented method may include receiving multiple text training examples, at 301. Each text training example may include a portion of text, multiple cut points that separate the portion of text into multiple segments, and for each of the multiple cut points in the text training example, an indication (e.g., a label) of the correctness of the cut point. Next, a cut classifier may be trained, using a machine learning technique, based on the multiple text training examples, to determine the correctness of a cut point in an input, at 302. As described herein, a cut classifier may be trained to classify the cut point in the input either a segmenting cut point or a non-segmenting cut point. In some cases, the cut classifier may be trained based on a script of the multiple text training examples.

According to an implementation, a machine learning technique may use one or more features to train the cut classifier for each of the multiple cut points in the set of text training examples. In general, the features used to train the classifier need to be the same as the features used to perform the classification by the cut classifier. For example, a feature that may be used to train a cut classifier based on the text training examples may be a coordinate of an endpoint of a first segment adjacent to a second segment defined at least in part by the cut point, a type of cut point associated with the cut point, a curvature of the input at the cut point, an input speed associated with strokes in the input, a region of the input in which the cut point is located, and the like. In addition or alternatively, other features or modified features may be used to train a cut classifier. For example, the number of adjacent segments and/or cut points used as features may be changed and the threshold on which the indication of the correctness of cut points is based may be changed to achieve a different recall, etc.

Various machine learning techniques may be used to train a cut classifier in a text recognition system. For example, a deep belief network may be trained to classify the cut points into segmenting and non-segmenting cuts, based on whether or not each cut point is actually between characters. Examples of other machine learning techniques that may be used to train a cut classifier include neural network, k-nearest neighbor, support vector machine, logistic regression, adaboost, Gaussian mixture model, and linear discriminant analysis, and the like. According to an implementation, a trained cut classifier model may be generated based on the multiple text training examples. Following generation of a trained cut classifier model, an input may be received at the cut classifier, and the trained cut classifier model may be applied to the input to classify the cut points inserted based on a heuristic, as described herein.

As mentioned above, text training examples that are used to train the cut classifier may include multiple cut points that separate the portion of text in a training example into multiple segments. According to an implementation, the multiple cut points that separate the portion of text into multiple segments may include a set of known character segmentations. In general, in order to train the cut classifier it may be necessary to have text training examples (e.g., handwriting data) with known character segmentations. A variety of techniques may be used to obtain text training examples with known character segmentation. Some examples of such techniques are manually segmenting text training examples (e.g., handwriting samples), force-aligning a text training example (e.g., a handwriting sample) with its label, and generating artificial text training examples. In some cases, known character segmentation data may be produced by manually labeling a segment based on where one character ends and the next character starts. This may be relatively easy in cases in which the characters are not connected, such that the segmentation always happens at character boundaries (e.g., stroke boundaries, in the case of a handwritten an input).

In some cases, a label for a whole text training example may be available but not the segmentation information. In this case, it may be possible to eliminate the need to manually label the cut points, and may enable the use of larger datasets. This may be achieved by performing forced alignment. Given a text recognition system that uses the heuristic-based segmentation, the system may be constrained to only recognize correct labels. As a result, the correct labels may be identified if the recognition succeeds. In addition, the recognition result may be analyzed to determine which part of the handwriting input corresponds to which part of the label. The recognition result may also be analyzed to determine which cut points, and resulting segments, the system should select to use from among the over-segmented cut points based on the applied heuristic. This may result in the known segmentation information that may be used to train the cut classifier.

Additionally, the text training examples (such as handwriting samples) available for training the cut classifier may not always contain a sufficient number of examples of all possible placements of characters. For example, long, overlapping, and multi-line an inputs are often underrepresented in the training examples. In this case, artificial training examples may be generated for these cases and may be used for training the cut classifier. Given text training examples with known segmentation information obtained by either manually labeling or performing forced alignment as described above, the system may know which part of an input corresponds to which part of a label. Therefore, a text training example may be manipulated by elongating (e.g., by concatenating training examples) or rearranging the input to generate additional artificial training examples.

Typically, training of a text recognition system is performed in iterations that alternate between forced alignment and learning parameters. For example, training a text recognition system based on a machine learning technique may include learning the character models and feature weights for a particular script as well as the cut classifier as described herein. A forced alignment iteration may segment an input into pieces that correspond to characters in the label, enabling character models to be learned. Feature weights may be learned such that different sources of information (e.g., character recognition results, cut point probabilities, language models, etc.) may be combined in an optimal way.

Training of a cut classifier may be integrated into the overall training pipeline of a text recognition system. For example, in the training pipeline of a text recognition system, the output of the forced alignment may be used to train of the character model. In addition, the output of the forced alignment may also be used to train the cut classifier. Optionally, the forced alignment output may also be used to generate artificial training data as described above, which may also be used to train the cut classifier. The trained cut classifier, along with the feature weights learned based on both the character models and the cut classifier, may be used to improve the forced alignment in the next iteration. In this integrated system setup, although the cut classifier from the last iteration may be used in the forced alignment, when training a new cut classifier, the cut points that are inserted based on application of the heuristic should be retained rather than the cut points classified as correct by the previous iteration of the cut classifier.

Implementations of the disclosed subject matter may be performed by any suitable system for text recognition based on a segmentation/recognition/decoding approach. As a specific example, a cut point classification and segmentation technique may be used by a text recognition system that has been trained according to the techniques described herein. Techniques for cut point classification and segmenting, and/or recognizing an input may be performed by any suitable system such as a machine learning system. In general, a decoding technique in a text recognition system may include a search of the best explanation of the overall input taking into account multiple possible segmentations and also other knowledge sources such as a language model. A step of known character matching and/or prediction may or may not be performed for each segment individually, and may be based on the context of all the segments in an input. Examples of techniques for recognizing one or more segments of an input may include neural networks, various feature extraction techniques, nearest neighbor search, support vector machines, and the like. For example, any of the steps described herein such as receiving an input, applying a heuristic to the input to insert cut points, generating a probability for each of the cut points, selecting multiple segments defined by cut points having a probability over a threshold, providing the segments to a recognizer, and/or training a cut classifier may be performed by an optical character recognition system, handwriting recognition system, a machine learning system, a recognition system based on a HMM based approach, neural networks, feature extraction, nearest neighbor search, support vector machines, and the like. As described throughout, the present disclosure provides techniques for classifying cut points and segmenting an input which may result in faster and more accurate text recognition.

In an implementation, the communication between a device that can receive an input and a text recognition provider may be across one or more bridges between the interfaces. For example, the communications between the device and the text recognition provider may be managed or assisted by a third device, such as, a coordinating device, a local coordinator, a remote server, etc. In such cases, the third device may, for example, apply a heuristic to an input and provide the segmented an input to the text recognition provider, in which case, the text recognition provider may generate a probability for each of the cut points and select multiple segments defined by cut points having a probability over a threshold. Alternatively, the third device may generate a probability for each of the cut points and select multiple segments defined by cut points having a probability over a threshold, and provide the multiple segments to a the text recognition provider for recognition. Accordingly, the text recognition provider may provide the recognized characters to the device that received the input. Similarly, a third device may manage or assist a text recognition provider in training a cut classifier to determine the correctness of a cut point in an input. Furthermore, more than one intermediate device may be implemented to facilitate communication between devices and a text recognition provider.

Implementations disclosed herein for classifying cut points and segmenting an input may result in more precise cut points in an input. With fewer cut points to consider, it may be easier to identify the best interpretation of an input. This may improve both the speed and the accuracy of the text recognition, especially for scripts with large sets of characters with many potential cut points (e.g., in cursive writing and scripts which have complex characters such as Chinese, Japanese, and Korean). Furthermore, segmentation of an input may be more flexible. Rather than applying complex and rigid cut point heuristics for every possible arrangement of characters in an input, the input may be aggressively segmented and the cut classifier may be trained to learn segmentations more accurately. As a result, the techniques described herein may improve both the speed and accuracy of a text recognition system.

Figure 4:
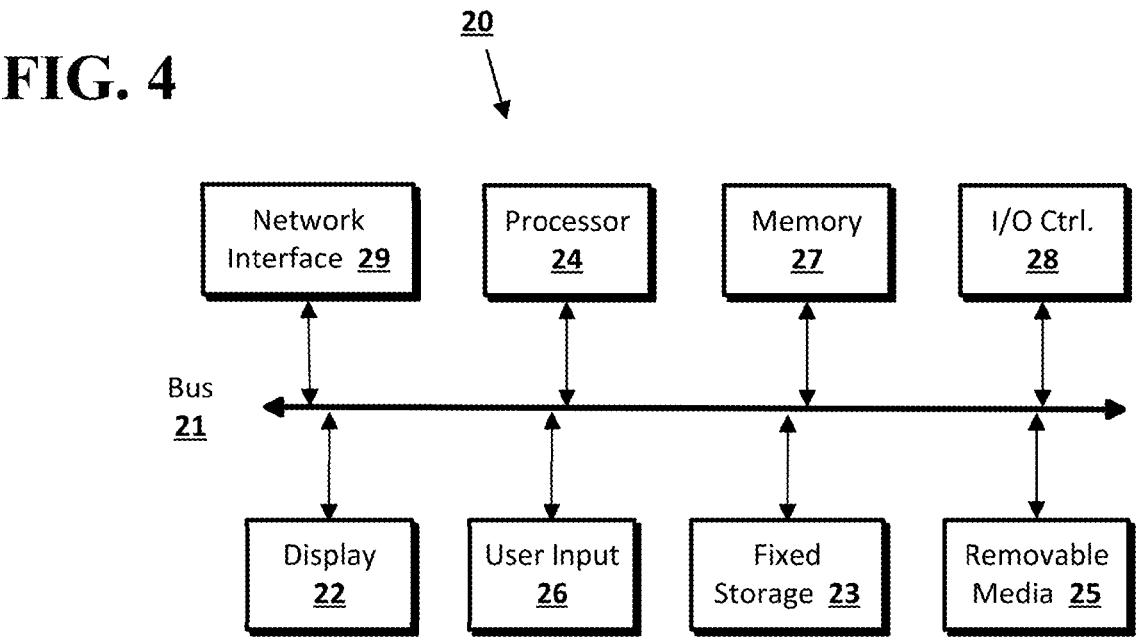
FIG. 4 shows a computer according to an embodiment of the disclosed subject matter.

Embodiments of the presently disclosed subject matter may be implemented in and used with a variety of component and network architectures. FIG. 4 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
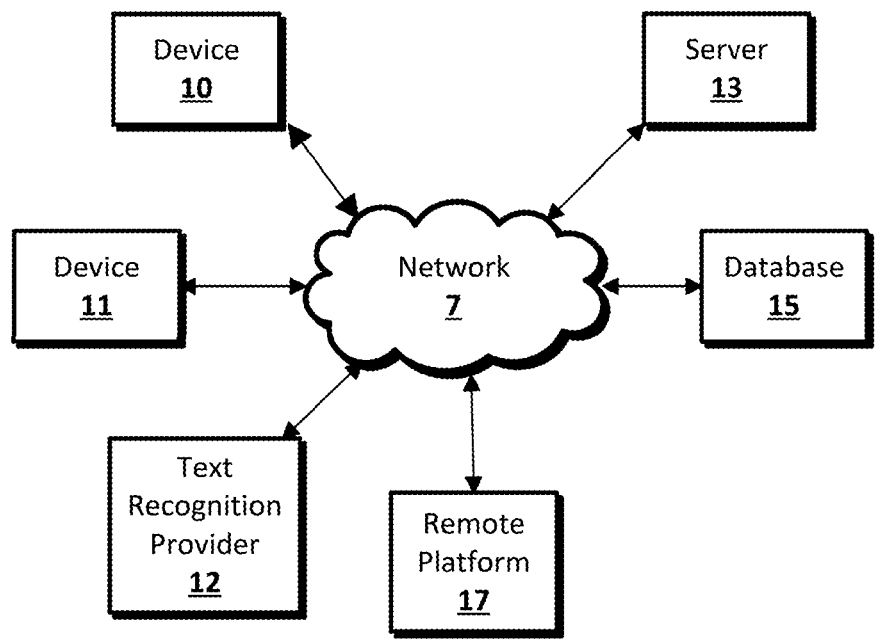
FIG. 5 shows a network configuration according to an embodiment of the disclosed subject matter.

FIG. 5 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more text recognition providers 12, servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more text recognition providers 12, servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. For example, while certain languages, scripts, phrases, words, and characters were chosen to illustrate the workings of the present disclosure, the teachings of the present disclosure are not so limited, and may apply to any appropriate language, script, and so on. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
   obtaining, for a sequence of strokes that represent a handwritten input, cut point data indicating one or more particular candidate cut points that are identified within the sequence of strokes;
   obtaining, for the one or more of the particular candidate cut points, feature data indicating one or more features of the particular candidate cut point;
   for each of the one or more particular candidate cut points, providing the feature data to a classifier that is trained to predict, based on one or more features of a candidate cut point, a likelihood of the candidate cut point being a correct cut point;
   for each of the one or more particular candidate cut points, receiving, from the classifier, data indicating the likelihood that the particular candidate cut point is a correct cut point;
   selecting a set of one or more of the particular candidate cut points whose respective likelihoods satisfy a threshold; and
   using the set of candidate cut points to segment the sequence of strokes.

2. The method of claim 1, wherein the one or more features of the candidate cut point comprises:
   a coordinate of the candidate cut point;
   a type of cut point associated with the candidate cut point;
   a curvature of the handwritten input at the candidate cut point; or
   an input speed of the handwritten input at the candidate cut point.

3. The method of claim 2, wherein the type of cut point is a local minimum cut point or an in-between cut point.

4. The method of claim 1, wherein the classifier is trained based on a neural network, k-nearest neighbor, support vector machine, logistic regression, adaboost, Gaussian mixture model, or linear discriminant analysis.

5. The method of claim 1, wherein a number of the set of the one or more particular candidate cut points whose respective likelihoods satisfy the threshold is less that a number of the one or more particular candidate cut points whose respective likelihood do not satisfy the threshold.

6. The method of claim 1, comprising:
   determining, for each segment of the handwritten between two adjacent candidate cut points of the set of the candidate cut points, a character that corresponds to the segment.

7. The method of claim 1, wherein the classifier is trained based on a plurality of handwritten inputs that each include a plurality of cut points each with an indication of a correctness of the cut point.

8. The method of claim 7, wherein the classifier is further trained on elongated or rearranged handwritten inputs from the plurality of handwritten inputs.

9. The method of claim 1, comprising:
   determining the threshold based on a user setting, a default setting, a number of the one or more particular candidate cut points, or a distribution of the likelihoods that the particular candidate cut points are correct cut points.

10. The method of claim 1, comprising:
    determining a type of script that corresponds to the handwritten input;
    determining a heuristic that is associated with the type of script,
    wherein the cut point data is obtained based on the heuristic.

11. The method of claim 10, wherein a type of script is a Latin script, Cyrillic script, or a Japanese script.

12. The method of claim 1, wherein the data indicating the likelihood that the particular candidate cut point is a correct cut point is a likelihood that the particular candidate cut point is in between characters.

13. A system comprising:
    one or more computers and one or more storage devices storing instructions that are operable, when executed by the one or more computers, to cause the one or more computers to perform operations comprising:
       obtaining, for a sequence of strokes that represent a handwritten input, cut point data indicating one or more particular candidate cut points that are identified within the sequence of strokes;
       obtaining, for the one or more of the particular candidate cut points, feature data indicating one or more features of the particular candidate cut point;
       for each of the one or more particular candidate cut points, providing the feature data to a classifier that is trained to predict, based on one or more features of a candidate cut point, a likelihood of the candidate cut point being a correct cut point;
       for each of the one or more particular candidate cut points, receiving, from the classifier, data indicating the likelihood that the particular candidate cut point is a correct cut point;
       selecting a set of one or more of the particular candidate cut points whose respective likelihoods satisfy a threshold; and
       using the set of candidate cut points to segment the sequence of strokes.

14. The system of claim 13, wherein the one or more features of the candidate cut point comprises:
    a coordinate of the candidate cut point;
    a type of cut point associated with the candidate cut point;
    a curvature of the handwritten input at the candidate cut point; or
    an input speed of the handwritten input at the candidate cut point.

15. The system of claim 14, wherein the type of cut point is a local minimum cut point or an in-between cut point.

16. The system of claim 13, wherein the classifier is trained based on a neural network, k-nearest neighbor, support vector machine, logistic regression, adaboost, Gaussian mixture model, or linear discriminant analysis.

17. The system of claim 13, wherein a number of the set of the one or more particular candidate cut points whose respective likelihoods satisfy the threshold is less that a number of the one or more particular candidate cut points whose respective likelihood do not satisfy the threshold.

18. The system of claim 13, wherein the operations further comprise:
    determining, for each segment of the handwritten between two adjacent candidate cut points of the set of the candidate cut points, a character that corresponds to the segment.

19. The system of claim 13, wherein the classifier is trained based on a plurality of handwritten inputs that each include a plurality of cut points each with an indication of a correctness of the cut point.

20. The system of claim 19, wherein the classifier is further trained on elongated or rearranged handwritten inputs from the plurality of handwritten inputs.

21. The system of claim 13, wherein the operations further comprise:
   determining the threshold based on a user setting, a default setting, a number of the one or more particular candidate cut points, or a distribution of the likelihoods that the particular candidate cut points are correct cut points.

22. The system of claim 13, wherein the operations further comprise:
   determining a type of script that corresponds to the handwritten input;
   determining a heuristic that is associated with the type of script,
   wherein the cut point data is obtained based on the heuristic.

23. The system of claim 22, wherein a type of script is a Latin script, Cyrillic script, or a Japanese script.

24. The system of claim 13, wherein the data indicating the likelihood that the particular candidate cut point is a correct cut point is a likelihood that the particular candidate cut point is in between characters.

25. A non-transitory computer-readable medium storing software comprising instructions executable by one or more computers which, upon such execution, cause the one or more computers to perform operations comprising:
   obtaining, for a sequence of strokes that represent a handwritten input, cut point data indicating one or more particular candidate cut points that are identified within the sequence of strokes;
   obtaining, for the one or more of the particular candidate cut points, feature data indicating one or more features of the particular candidate cut point;
   for each of the one or more particular candidate cut points, providing the feature data to a classifier that is trained to predict, based on one or more features of a candidate cut point, a likelihood of the candidate cut point being a correct cut point;
   for each of the one or more particular candidate cut points, receiving, from the classifier, data indicating the likelihood that the particular candidate cut point is a correct cut point;
   selecting a set of one or more of the particular candidate cut points whose respective likelihoods satisfy a threshold; and
   using the set of candidate cut points to segment the sequence of strokes.

26. The medium of claim 25, wherein the one or more features of the candidate cut point comprises:
   a coordinate of the candidate cut point;
   a type of cut point associated with the candidate cut point;
   a curvature of the handwritten input at the candidate cut point; or
   an input speed of the handwritten input at the candidate cut point.

27. The medium of claim 26, wherein the type of cut point is a local minimum cut point or an in-between cut point.

28. The system of claim 25, wherein the classifier is trained based on a neural network, k-nearest neighbor, support vector machine, logistic regression, adaboost, Gaussian mixture model, or linear discriminant analysis.

29. The medium of claim 25, wherein a number of the set of the one or more particular candidate cut points whose respective likelihoods satisfy the threshold is less that a number of the one or more particular candidate cut points whose respective likelihood do not satisfy the threshold.

30. The medium of claim 25, wherein the operations further comprise:
   determining, for each segment of the handwritten between two adjacent candidate cut points of the set of the candidate cut points, a character that corresponds to the segment.

31. The medium of claim 25, wherein the classifier is trained based on a plurality of handwritten inputs that each include a plurality of cut points each with an indication of a correctness of the cut point.

32. The medium of claim 31, wherein the classifier is further trained on elongated or rearranged handwritten inputs from the plurality of handwritten inputs.

33. The medium of claim 25, wherein the operations further comprise:
   determining the threshold based on a user setting, a default setting, a number of the one or more particular candidate cut points, or a distribution of the likelihoods that the particular candidate cut points are correct cut points.

34. The medium of claim 25, wherein the operations further comprise:
   determining a type of script that corresponds to the handwritten input;
   determining a heuristic that is associated with the type of script,
   wherein the cut point data is obtained based on the heuristic.

35. The medium of claim 34, wherein a type of script is a Latin script, Cyrillic script, or a Japanese script.

36. The medium of claim 25, wherein the data indicating the likelihood that the particular candidate cut point is a correct cut point is a likelihood that the particular candidate cut point is in between characters.

* * * * *